United States Patent
Smiley et al.

(10) Patent No.: US 9,248,907 B2
(45) Date of Patent: Feb. 2, 2016

(54) ENGINE STARTING SYSTEM FOR ROTORCRAFT IN FLIGHT

(75) Inventors: Alfred Russell Smiley, Marlborough, CT (US); Michael Peter Strauss, New Haven, CT (US); James Peter Cycon, Media, PA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 757 days.

(21) Appl. No.: 13/412,778

(22) Filed: Mar. 6, 2012

(65) Prior Publication Data
US 2013/0233977 A1    Sep. 12, 2013

(51) Int. Cl.
| | |
|---|---|
| *B64D 33/00* | (2006.01) |
| *B64D 35/08* | (2006.01) |
| *B64C 27/12* | (2006.01) |
| *B64D 41/00* | (2006.01) |

(52) U.S. Cl.
CPC .................. *B64C 27/12* (2013.01); *B64D 33/00* (2013.01); *B64D 35/08* (2013.01); *B64D 41/00* (2013.01)

(58) Field of Classification Search
CPC ........ B64D 33/00; B64D 35/00; B64D 35/08; B64D 2221/00
USPC .............. 244/53 A, 58, 60; 60/787, 778, 779; 307/81
See application file for complete search history.

(56) References Cited

U.S. PATENT DOCUMENTS

| | | | |
|---|---|---|---|
| 3,963,372 A | 6/1976 | McLain et al. | |
| 4,947,334 A * | 8/1990 | Massey et al. | 244/17.13 |
| 5,899,411 A | 5/1999 | Latos et al. | |
| 6,344,700 B1 | 2/2002 | Eisenhauer et al. | |
| 6,992,403 B1 | 1/2006 | Raad | |
| 7,482,709 B2 | 1/2009 | Berenger | |
| 7,513,119 B2 | 4/2009 | Zielinski et al. | |
| 8,424,800 B2 * | 4/2013 | Finney | 244/58 |
| 2009/0145998 A1 | 6/2009 | Salyer | |
| 2011/0178648 A1 | 7/2011 | Calvignac et al. | |
| 2012/0025032 A1 * | 2/2012 | Hopdjanian et al. | 244/53 R |
| 2013/0086919 A1 * | 4/2013 | Dooley et al. | 60/778 |

* cited by examiner

Primary Examiner — Tien Dinh
Assistant Examiner — Richard R Green
(74) Attorney, Agent, or Firm — Cantor Colburn LLP

(57) ABSTRACT

A rotorcraft engine starting system includes a starting system controller in communication with a flight control computer; an electric engine starter; an electronic engine controller in communication with the electric engine starter; an electrical power distributor; and a plurality of power sources coupled to the electrical power distributor; the starting system controller selecting at least one of the plurality of power sources and instructing the electrical power distributor to use the at least one of the plurality of power sources to power the electric engine starter.

14 Claims, 3 Drawing Sheets

ENGINE STARTING SYSTEM FOR ROTORCRAFT IN FLIGHT

BACKGROUND

The subject matter disclosed herein relates generally to engine starting systems, and in particular to an engine starting system for starting a rotorcraft engine while the rotorcraft is in flight.

Existing aircraft will occasionally need to start an engine while the aircraft is in flight. This may be due to a failure experienced by the engine (e.g., a flameout) or due to an intended shut down of the engine in flight. It is sometimes desirable to shut down one or more engines in flight, when power requirements allow, in order to conserve fuel. In order to shut down an engine in flight, the engine restart system needs to have sufficient reliability. As such, improvements in engine starting systems would be well received in the art.

SUMMARY

One embodiment includes a rotorcraft engine starting system that includes a starting system controller in communication with a flight control computer; an electric engine starter; an electronic engine controller in communication with the electric engine starter; an electrical power distributor; and a plurality of power sources coupled to the electrical power distributor; the starting system controller selecting at least one of the plurality of power sources and instructing the electrical power distributor to use the at least one of the plurality of power sources to power the electric engine starter.

Another embodiment is a rotorcraft including an engine; a main gearbox transferring force from the engine to a rotor hub; a flight control computer; a starting system controller in communication with the flight control computer; an electric engine starter coupled to the engine; an electronic engine controller in communication with the electric engine starter; an electrical power distributor; and a plurality of power sources coupled to the electrical power distributor; the starting system controller selecting at least one of the plurality of power sources and instructing the electrical power distributor to use the at least one of the plurality of power sources to power the electric engine starter.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
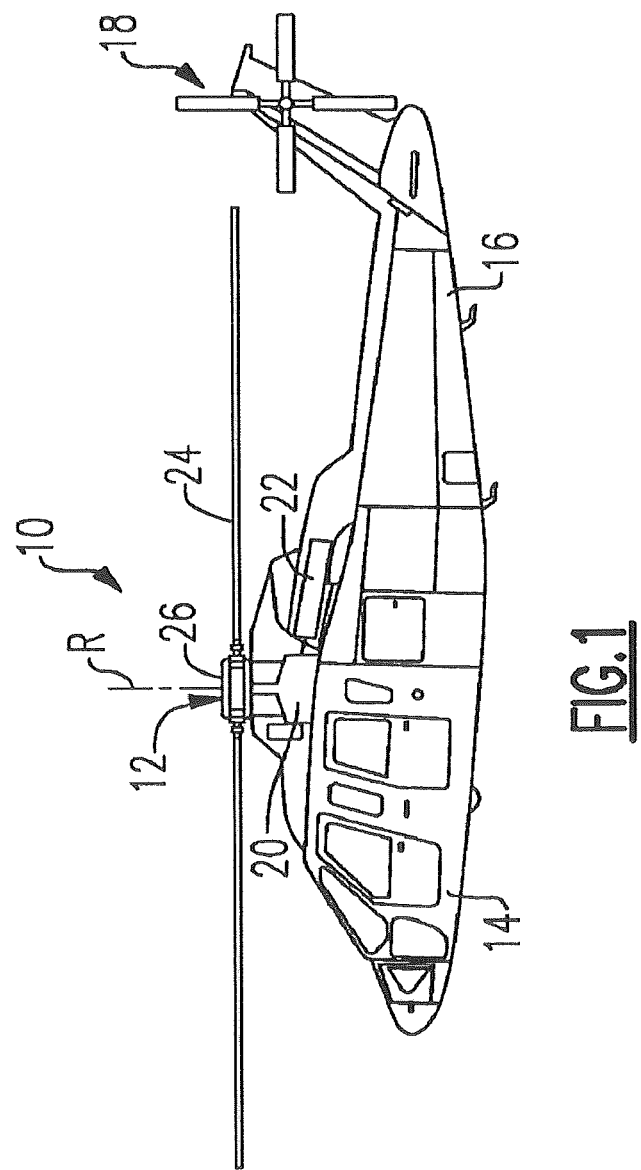
FIG. 1 illustrates and exemplary rotorcraft.

FIG. 1 schematically illustrates a rotary-wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a multiple of rotor blades 24 mounted to a rotor hub 26. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention.

Figure 2:
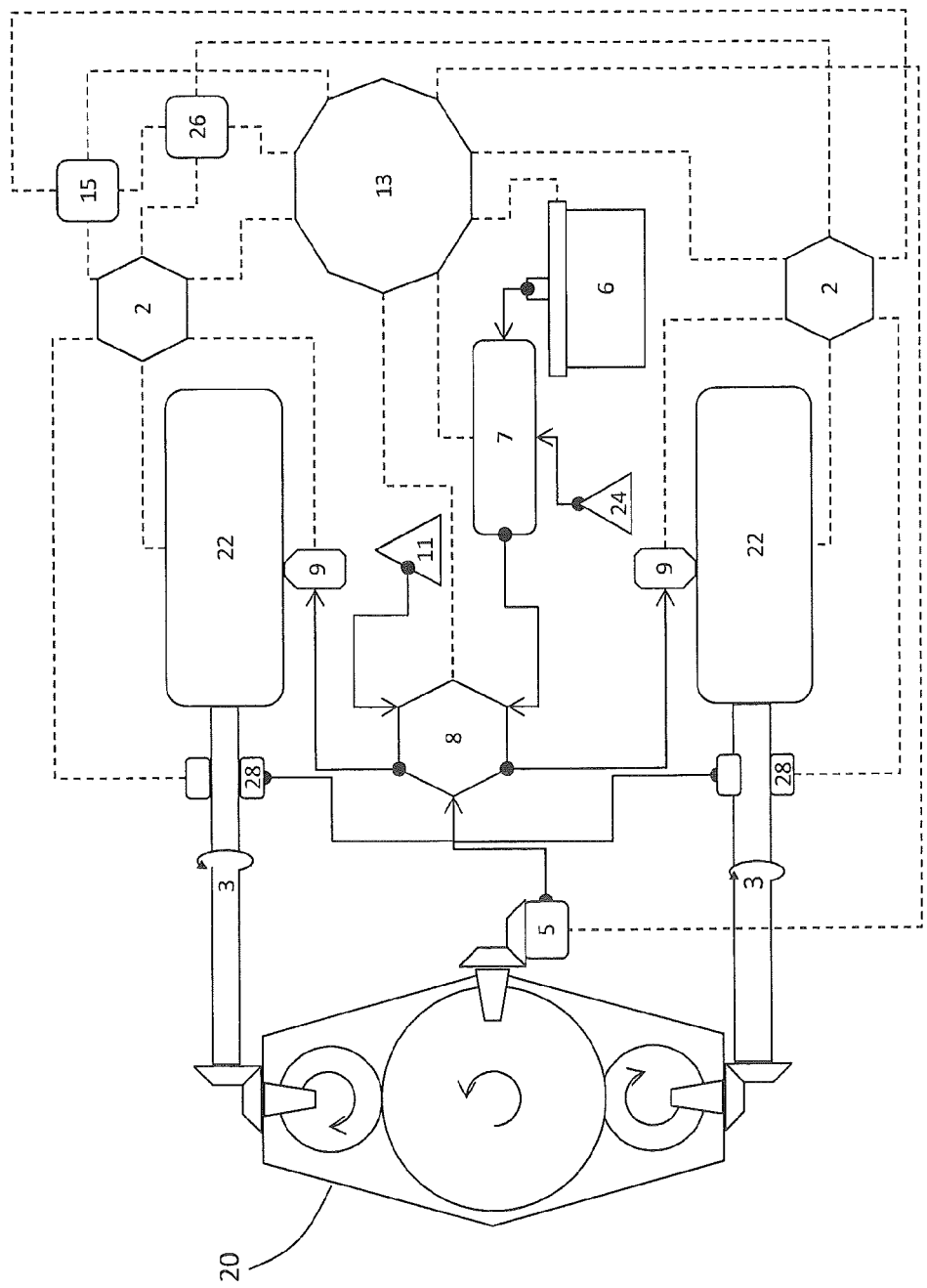
FIG. 2 depicts an engine starting system architecture in an exemplary embodiment.

FIG. 2 depicts an engine starting system architecture in an exemplary embodiment. The system of FIG. 2 includes a number of mechanisms to improve reliability in starting a rotorcraft engine during flight. The system includes main gear box 20, which is driven by power output shafts 3, driven by engines 22. Main gear box 20 develops torque for rotorcraft lift, thrust, and control and supplies torque to gearbox-mounted generator 5. Engines 22 are conventional liquid fuel engines and include any liquid fuel conversion device that outputs mechanical shaft power, such as turboshaft, reciprocating, and rotary engines. An electronic engine controller 2 is associated with each engine and electronically controls engine operation including starting, fuel consumption, ignition timing, etc.

Each engine includes an electric engine starter 9 which starts engine 22. Electric engine starter 9 may receive electrical power from one or more power sources. An electrical power distributor 8 serves as distribution point for multiple sources of electrical power. In exemplary embodiments, the electrical power distributor 8 receives AC power from multiple sources, conditions the respective power signals (if necessary) and outputs power to an electric engine starter 9 to start engine 22, under the control of starting system controller 13. It is understood that electrical power distributor 8 may be a universal power distributor, accepting both AC and DC sources of power. Operation of the starting system controller 13 is described in further detail herein.

The electrical power distributor 8 receives electrical power from a variety of sources. One power source providing electrical power to the electrical power distributor 8 is gearbox-mounted generator 5. In exemplary embodiments, gearbox-mounted generator 5 produces AC power in response to rotation of main gear box 20. Another power source providing electrical power to the electrical power distributor 8 is power shaft generators 28 mechanically coupled to each power output shaft 3. Power shaft generators 28 may be any type of generator capable of being driven by a rotating shaft. In exemplary embodiments, each power shaft generator 28 produce AC power in response to rotation of a power output shaft 3.

Another power source providing electrical power to the electrical power distributor 8 is AC ground power 11. AC ground power 11 is electrical power that is provided to the rotorcraft when the rotorcraft is on the ground. AC ground power 11 may be provided by an electrical cable supplying AC electrical power.

A DC electric battery 6 is connected to the electrical power distributor 8 through a DC power inverter 7. Power inverter 7 converts the DC battery electrical power from DC to AC and then routes the AC electrical power to electrical power distributor 8. A DC ground power source 24 also provides DC electrical power to electrical power distributor 8. DC ground power 24 is electrical power that is provided to the rotorcraft when the rotorcraft is on the ground. DC ground power 24 may be provided by an electrical cable supplying DC electrical power. It is understood that other types of power sources (e.g., thermoelectric generators, fuel cells, etc.) may be used in the system of FIG. 2, and that embodiments of the invention encompass a variety of power sources in addition to those shown in FIG. 2.

Starting system controller 13 controls starting of engines 22 when the rotorcraft 10 is on the ground and when rotorcraft 10 is in flight. The starting system controller 13 may be implemented using a microprocessor or microcontroller executing a computer program code to implement the processes described here. Starting system controller 13 interfaces with all system components, including flight control computer 26, vehicle health monitor system 15 and electronic engine controllers 2. Through electronic engine controllers 2, starting system controller 13 can obtain engine status information, electric engine starter 9 status information and power shaft generator 28 status information. Starting system controller 13 also interfaces with battery 6, inverter 7 and electrical power distributor 8 to obtain status information and send control commands to these components.

Figure 3:
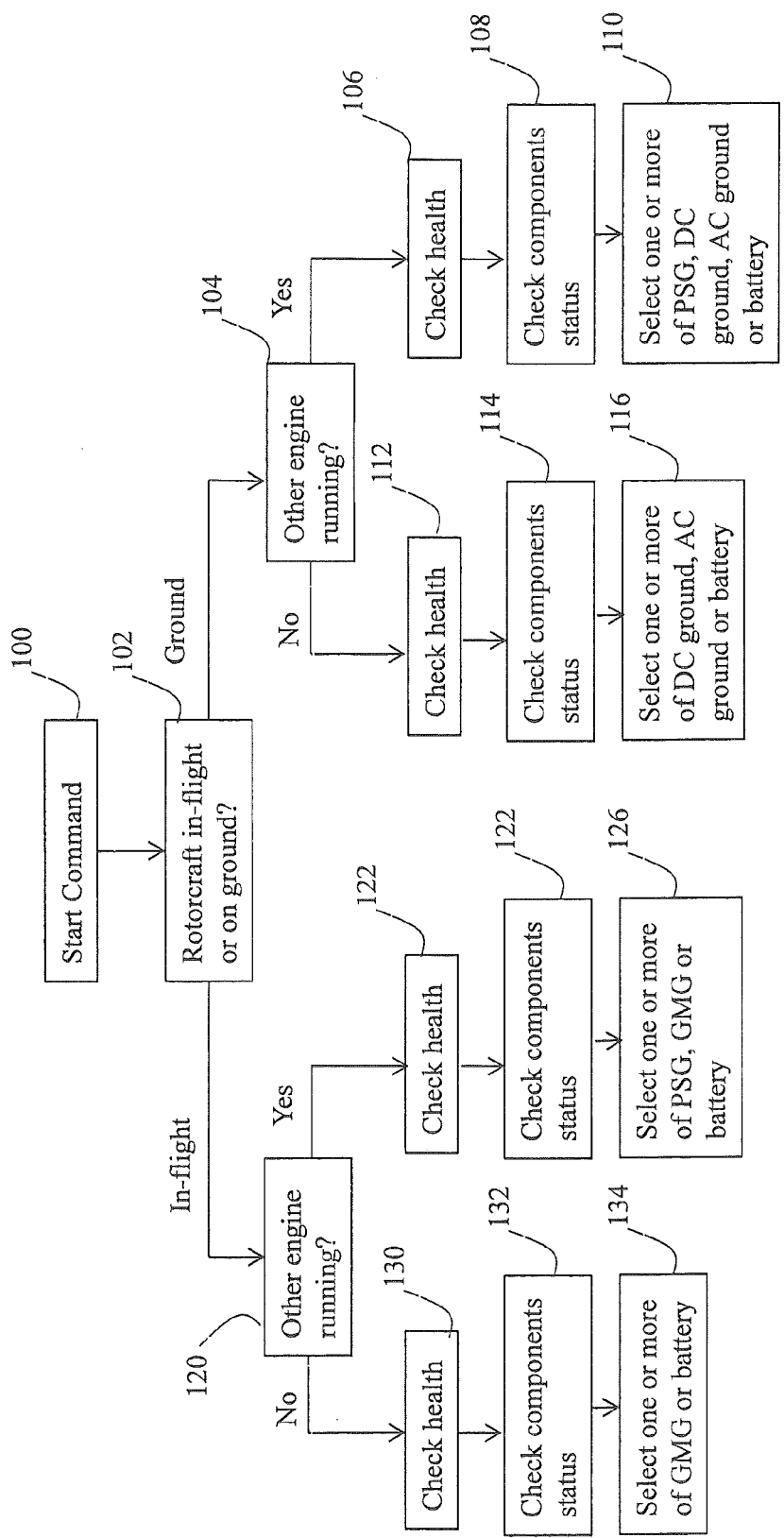
FIG. 3 depicts a process for starting an engine in an exemplary embodiment.

FIG. 3 is a flowchart of an exemplary process executed by starting system controller 13 to start an engine. The process begins at 100 where the starting system controller 13 receives a command to start one of engines 22. This command may originate from the flight control computer 26 in response to a pilot command or a detected condition by the flight control computer 26 (e.g., engine flameout in-flight). At 102, the starting system controller 13 determines whether the rotorcraft is on the ground or in-flight. This may be based on a signal from the flight control computer 26, such as a weight-on-wheels indication.

If the rotorcraft is on the ground, flow proceeds to 104 where the starting system controller 13 determines if any other engines are running. This may be performed by the starting system controller 13 querying the flight control computer 26 and/or querying the electronic engine controllers 2.

If another engine is running, flow proceeds to 106 where the starting system controller 13 communicates with vehicle health monitor system 15 to determine if there are any system components or conditions that may interfere with starting the idle engine. For example, the vehicle health monitor system 15 may indicate that a fuel delivery module to the idle engine is experiencing control errors, indicating that engine starting may not be appropriate at this time. At 108, the starting system controller 13 also detects status of the starting system components, such as battery 6 health/charge, inverter 7 status, electric engine starter 9 status, presence of DC ground power 24, presence of AC ground power 11, status of electrical power distributor 8 and status of power shaft generator 28.

At 110, the starting system controller 13 selects one or more of the power shaft generator (PSG) 28, DC ground power 24, AC ground power 11 and battery 6 for starting the idle engine. The selection of the power source to start the idle engine may be based on a priority schedule and the status of the power sources. For example, the power shaft generator 28 may be identified as a primary source of power, such that the starting system controller 13 would select the power shaft generator 28, if sufficient power is available. If the power shaft generator 28 is not available or is not producing sufficient power to start the engine, a lower priority power source would be selected, such as AC ground power 11. The starting system controller 13 then commands the electrical power distributor 8 to provide power from the selected power sources to the electric engine starter 9 and commands the electronic engine controller 2 to start the engine.

If at 104 another engine is not running, flow proceeds to 112 where the starting system controller 13 communicates with vehicle health monitor system 15 to determine if there are any system components that may interfere with starting the idle engine. At 114, the starting system controller 13 also detects status of the starting system components, such as battery 6 health/charge, inverter 7 status, electric engine starter 9 status, presence of DC ground power 24, presence of AC ground power 11, and status of electrical power distributor 8. At 116, the starting system controller 13 selects one or more of the DC ground power 24, AC ground power 11 and battery 6 for starting the idle engine. The selection of the power source to start the idle engine may be based on a priority schedule and the status of the power sources, as described above.

If at 102, the starting system controller 13 determines the rotorcraft is in flight, flow proceeds to 120, where the starting system controller 13 determines if any other engines are running. This may be performed by the starting system controller 13 querying the flight control computer 26 and/or querying the electronic engine controllers 2.

If another engine is running at 120, flow proceeds to 122 where the starting system controller 13 communicates with vehicle health monitor system 15 to determine if there are any system components that may interfere with starting the idle engine. At 124, the starting system controller 13 also detects status of the starting system components, such as battery 6 health/charge, inverter 7 status, electric engine starter 9 status, status of electrical power distributor 8, status of gearbox-mounted generator 5 and status of power shaft generator 28.

At 126, the starting system controller 13 selects one or more of the power shaft generator (PSG) 28, gearbox-mounted generator (GMG) 5 and battery 6 for starting the idle engine. The selection of the power source to start the idle engine may be based on a priority schedule and the status of the power sources, as described above.

If at 120 another engine is not running, flow proceeds to 130 where the starting system controller 13 communicates with vehicle health monitor system 15 to determine if there are any system components that may interfere with starting the idle engine. At 132, the starting system controller 13 also detects status of the starting system components, such as battery 6 health/charge, inverter 7 status, electric engine starter 9 status, status of electrical power distributor 8, and status of gearbox-mounted generator 5.

At 134, the starting system controller 13 selects one or more of the gearbox-mounted generator (GMG) 5 and battery 6 for starting the idle engine. The selection of the power source to start the idle engine may be based on a priority schedule and the status of the power sources, as described above.

In an alternate embodiment, the electric engine starter 9 is an electric engine starter-generator. The electric engine starter-generator acts as a starter to crank engine 22 when starting is needed. At other times, the electric engine starter-generator produces power when the engine 22 is running, and provides power to electrical power distributor 8. In this embodiment, the starting system controller 13 would also check the status of the electric engine starter-generator at steps 108 and 124, and be able to select the electric engine starter-generator at steps 110 or 126 as one of the available power sources.

In another alternate embodiment, the power shaft generators 8 are eliminated from the system. This eliminates weight associated with the power shaft generators 8. Of course, the starting system controller 13 would not be able to select the power shaft generators 8 as a potential power source for starting the engines 22 in this embodiment.

In another alternate embodiment, the gearbox-mounted generator 5 is eliminated from the system. This eliminates weight associated with the gearbox-mounted generator 5. Of course, the starting system controller 13 would not be able to select the gearbox-mounted generator 5 as a potential power source for starting the engines 22 in this embodiment.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotorcraft engine starting system comprising:
a starting system controller in communication with a flight control computer;
a first electric engine starter-generator for starting a first engine and a second electric engine starter-generator for starting a second engine;
an electrical power distributor; and
a plurality of power sources coupled to the electrical power distributor, the plurality of power sources including a power shaft generator mechanically coupled to an output shaft of the first engine and a main gearbox-mounted generator;
the starting system controller selecting at least one of the power shaft generator and the main gearbox-mounted generator and instructing the electric power distributor to use the at least one of the power shaft generator and the main gearbox-mounted generator to power the second electric engine starter-generator;
wherein when the rotorcraft is in flight and the first engine is running, the starting system controller selects the power shaft generator to power the second electric engine starter-generator;
wherein when the rotorcraft is in flight and the first engine is not running, the starting system controller selects the main gearbox-mounted generator to power the second electric engine starter-generator.

2. The rotorcraft engine starting system of claim 1 wherein:
the starting system controller determines if the rotorcraft is in flight or on the ground.

3. The rotorcraft engine starting system of claim 2 wherein:
the starting system controller determines if the first engine is running.

4. The rotorcraft engine starting system of claim 3 wherein:
when the rotorcraft is on the ground and the first engine is running, the starting system controller selects the power shaft generator to power the second electric engine starter-generator.

5. The rotorcraft engine starting system of claim 3 wherein:
when the rotorcraft is on the ground and the first engine is not running, the starting system controller selects at least one of DC ground power, AC ground power and a battery to power the second electric engine starter-generator.

6. The rotorcraft engine starting system of claim 1 wherein:
prior to selecting the power shaft generator, the starting system controller communicates with a vehicle health monitoring system to determine an ability to start the second engine.

7. The rotorcraft engine starting system of claim 1 wherein:
selecting the power shaft generator includes determining a priority of available power sources.

8. A rotorcraft comprising:
a first engine and a second engine;
a first electric engine starter-generator for starting the first engine and a second electric engine starter-generator for starting the second engine;
a main gearbox transferring force from to a rotor hub;
a flight control computer;
a starting system controller in communication with the flight control computer;
an electric power distributor; and
a plurality of power sources coupled to the electrical power distributor, the plurality of power sources including a power shaft generator mechanically coupled to an output shaft of the first engine and a main gearbox-mounted generator;
the starting system controller selecting at least one of the power shaft generator and the main gearbox-mounted generator to power the second electric engine starter-generator;
wherein when the rotorcraft is in flight and the first engine is running, the starting system controller selects the power shaft generator to power the second electric engine starter-generator;
wherein when the rotorcraft is in flight and the first engine is not running, the starting system controller selects the main gearbox-mounted generator to power the second electric engine starter-generator.

9. The rotorcraft of claim 8 wherein:
the starting system controller determines if the rotorcraft is in flight or on the ground, and selects the power shaft generator in response to the rotorcraft being in-flight or on the ground.

10. The rotorcraft of claim 9 wherein:
the starting system controller determines if the first engine is running.

11. The rotorcraft of claim 10 wherein:
when the rotorcraft is on the ground and the first engine is running, the starting system controller selects the power shaft generator to power the second electric engine starter-generator.

12. The rotorcraft of claim 10 wherein:
when the rotorcraft is on the ground and the first engine is not running, the starting system controller selects at least one of DC ground power, AC ground power and a battery to power the second electric engine starter-generator.

13. The rotorcraft of claim 8 wherein:
prior to selecting the power shaft generator, the starting system controller communicates with a vehicle health monitoring system to determine an ability to start the second engine.

14. The rotorcraft of claim 8 wherein:
selecting the power shaft generator includes determining a priority of available power sources.

* * * * *